United States Patent [19]
Chijiwa et al.

[11] Patent Number: 6,085,204
[45] Date of Patent: Jul. 4, 2000

[54] ELECTRONIC DICTIONARY AND INFORMATION DISPLAYING METHOD, INCORPORATING ROTATING HIGHLIGHT STYLES

[75] Inventors: Hideaki Chijiwa, Nara; Toshio Isoe, Tenri, both of Japan

[73] Assignee: Sharp Kabushiki Kaisha, Osaka, Japan

[21] Appl. No.: 08/925,324

[22] Filed: Sep. 8, 1997

[30] Foreign Application Priority Data

Sep. 27, 1996 [JP] Japan .................................. 8-256976

[51] Int. Cl.⁷ .................................................. G06F 17/21
[52] U.S. Cl. ........................ 707/529; 707/528; 707/531
[58] Field of Search .................................. 707/526–529, 707/531, 532

[56] References Cited

U.S. PATENT DOCUMENTS

| | | | |
|---|---|---|---|
| 4,951,226 | 8/1990 | Sasaki | 364/518 |
| 5,153,575 | 10/1992 | Watts, Jr. et al. | 340/790 |
| 5,655,128 | 8/1997 | Hideo Fushimoto | 395/760 |
| 5,663,748 | 9/1997 | Huffman et al. | 345/173 |
| 5,697,793 | 12/1997 | Huffman et al. | 434/317 |
| 5,745,776 | 4/1998 | Sheppard, II | 395/794 |
| 5,748,906 | 5/1998 | Sandig | 395/251 |
| 5,761,681 | 6/1998 | Huffman et al. | 707/500 |
| 5,802,533 | 9/1998 | Walker | 707/529 |

FOREIGN PATENT DOCUMENTS

| | | |
|---|---|---|
| 58-64567 | 4/1983 | Japan . |
| 59-52377 | 3/1984 | Japan . |
| 3-237561 | 10/1991 | Japan . |
| 7-114565 | 5/1995 | Japan . |

OTHER PUBLICATIONS

Webster's II, New Riverside University Dictionary, Houghton Mifflin Co., pp. 10–21, 1984.

*Primary Examiner*—Stephen S. Hong
*Assistant Examiner*—Robert D. Bourque

[57] ABSTRACT

An electronic dictionary, in which a highlight style storage section in a ROM pre-stores display data of a variety of styles for the highlight display, such as a solid shade, an underline, and a frame all in red. When a user selects an item for highlight display through an input section, a central processing unit allocates a style that has been used least frequently to the selected item, and synthesizes display data associated with the allocated style. Subsequently, at least either the title or attribute information of the selected item (i.e., the resulting synthesized display data) is displayed on a liquid crystal display section.

13 Claims, 15 Drawing Sheets

ENGLISH DICTIONARY

ENTER WORD?

clear
(k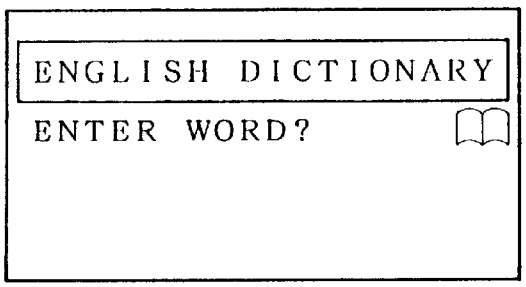ər) v.
1. To make or become light, clear, or bright.
2. To rid of impurities or blemishes.
3. To make plain or intelligible.
4. To rid of obstructions.
5. To remove the occupants of: *clear the theather.*

—phrasal verb.
  clear out
    *Informal.* To leave a place, usu. quickly.
    < Latin "clarus".

—clear' ly.
  adv.

—clear' ness.
  n

*Syns:* obvious, limpid, lucid, pellucid, transparent

*ANT:* opaque adj.

FIG.4

| HIGHLIGHT | | |
|---|---|---|
| Pronunciation | B | R |
| Phrasal Verb | B | R |
| Idiom | B | R |
| Synonym | B | R |
| Antonym | B | R |
| Usage | B | R |

# ELECTRONIC DICTIONARY AND INFORMATION DISPLAYING METHOD, INCORPORATING ROTATING HIGHLIGHT STYLES

FIELD OF THE INVENTION

The present invention relates to an electronic dictionary pre-storing headwords together with their respective attribute information composed of a plurality of items, such as a pronunciation, a phrasal verb, an idiom, a synonym, an antonym, and a usage, so that the attribute information of a headword is retrieved and displayed on a display when a user enters the headword. The present invention also relates to an information displaying method adopted for the above electronic dictionary.

BACKGROUND OF THE INVENTION

Recently, the application of portable information devices has been advancing, and examples of such information devices include an electronic dictionary and an electronic translator both furnished with a display, such as a liquid crystal display panel, on which the attribute information of a word or an example translation information of a sentence is displayed when the word or sentence is entered. The attribute information of a word referred herein includes various kinds of information related to the word, for example, a part of speech, a pronunciation, a definition, an idiom, an antonym, a synonym, and a usage of the word.

The conventional electronic translator and electronic dictionary have been modified in various manners, so that the information the user wishes to see can be retrieved efficiently.

For example, Japanese Laid-open Patent Application No. 52377/1984 (Tokukaisho No. 59-52377) discloses an electronic translator, with which the user can retrieve a word according to an arbitrary item he has specified from the item data including an intransitive verb, a past tense, an irregular verb, etc.

Japanese Laid-open Patent Application No. 114565/1995 (Tokukaihei 7-114565) discloses an electronic dictionary furnished with a dictionary database including dictionary data comparable to the content of a hard copy of a general English-to-Japanese dictionary, namely, headwords, parts of speech, definitions, examples, idioms, usages, etc., so that example translation information of an idiom or a usage is displayed. Also, the headword to which the idiom or usage is registered can be retrieved further in this electronic dictionary. Thus, the dictionary data including the part of speech, definition and the like of the headword are displayed in addition to the example translation information of the idiom or usage. This arrangement was devised to provide an electronic dictionary which can display not only the example translation of the retrieved idiom or usage, but also the related information without any further retrieving manipulation, thereby simplifying the retrieving manipulation and enabling the user to use the dictionary efficiently.

The electronic translator and electronic dictionary mainly handle character information, and have been steadily modified in various manners to display a huge quantity of character information on a display in an easy-to-see manner along with the recent improvements of the resolution or colors of the display.

For example, Japanese Laid-open Patent Application No. 64567/1983 (Tokukaisho 58-64567) discloses an information retrieving device which displays requested character information together with additional information which does not impair the original display content. Examples of the additional information are a background color, an underline, coloring of a character, etc. Further, besides the information related to the translation and meaning of each headword, the information retrieving device pre-stores another kind of additional information, such as importance, field information, and category information of the headword, so that when the headword is displayed, the firstly mentioned additional data are appended to the character information in order of importance rank of the headword, for example.

Japanese Laid-open Patent Application No. 237561/1991 (Tokukaihei 3-237561) discloses an electronic dictionary which stores word information of a word the user has selected into a mark memory section, so that the word is displayed distinguishably from a normal display by being displayed with a reversed background or displaying a mark at the edge of the screen.

However, there has been an increasing demand for a further developed electronic dictionary which can highlight a specific kind of attribute information stored in connection with the headword as per user's selection. It is more preferable that the electronic dictionary can highlight a plurality of kinds of attribute information in such a manner that each kind of attribute information can be distinguished from the others when the user has selected more than one kind of attribute information. If all the selected kinds of attribute information are highlighted in different colors, one kind of attribute information can be readily distinguished from another. However, this method demands a multi-color high-performance display, thereby undesirably increasing the manufacturing costs.

SUMMARY OF THE INVENTION

It is therefore an object of the present invention to (1) highlight a specific kind of attribute information the user has selected so as to be readily distinguished from the non-selected kinds, and (2) highlight a plurality of kinds of attribute information in such a manner that each kind can be distinguished from the others when the user has selected more than one kind of attribute information.

To fulfill the above object, an electronic dictionary of the present invention is characterized by being furnished with:

a storage section for storing headwords and attribute information related to the headwords;

a display section for displaying the headword and the attribute information stored in the storage section;

a selecting section for selecting an arbitrary item of the attribute information; and a display control section for displaying at least one of a title and the attribute information of the item selected by the selecting section in a style different from a style used for a non-selected item.

According to the above arrangement, once the user selects an arbitrary item of the attribute information by means of the selecting section, at least the title or attribute information of the selected item is displayed in a style different from a style used for the non-selected item(s). Accordingly, of all the items of the attribute information stored in connection with the headwords, the visibility of the item the user has selected can be improved, so that the information the user needs most can be display in an easy-to-find manner. Consequently, it has become possible to provide an electronic dictionary which can display a large quantity of character information in an easy-to-see manner.

Also, to fulfill the above object, an information displaying method of the present invention is a method adopted to an electronic dictionary for storing attribute information of a plurality of items related to headwords and displaying the attribute information of a specified headword, and characterized by being composed of:

an item selecting step of selecting an item to be highlighted; and a displaying step for displaying at least one of a title and the attribute information of the item selected in the item selecting step in a style different from a style used for a non-selected item.

According to the above method, once the user selects an arbitrary item, the attribute information of the selected item is displayed in a style different from a style used for the attribute information the non-selected item(s). Accordingly, of all the items of the attribute information stored in connection with the headwords, the visibility of the item the user has selected can be improved, so that the information the user needs most can be display in an easy-to-find manner. Consequently, it has become possible to display a large quantity of character information in an easy-to-see manner on the electronic dictionary.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is an explanatory view illustrating an example headword input screen displayed on a liquid crystal display section through which the user enters a headword into the electronic dictionary;

FIG. 3(b) is an explanatory view illustrating an example screen displayed on the liquid crystal display section after the user entered the headword;

FIG. 4 is an explanatory view illustrating an example highlight item setting screen displayed on the liquid crystal display section through which the user selects an item he wishes to highlight;

DESCRIPTION OF THE EMBODIMENTS

Embodiment 1

Referring to FIGS. 1 through 15, the following description will describe an example embodiment of the present invention.

Figure 2:
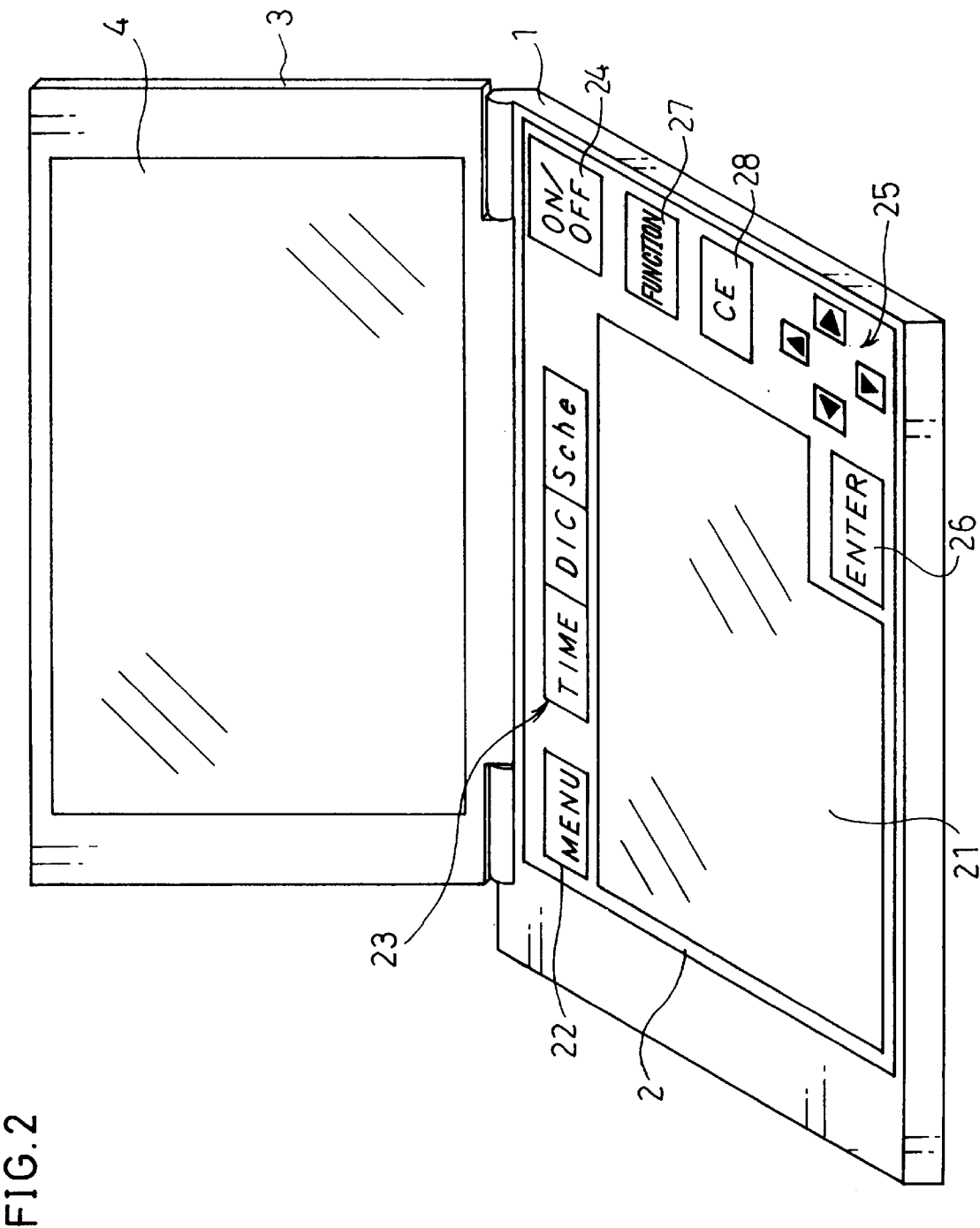
FIG. 2 is a perspective view showing an appearance of the above electronic dictionary.

FIG. 2 is a perspective view showing an appearance of an electronic dictionary in accordance with the example embodiment of the present invention. As is shown in the drawing, the electronic dictionary of the present invention comprises a main body cabinet section 1 having an input section 2 equipped with a hard keyboard, and a flip-up lid 3 having a liquid crystal display section 4. The flip-up lid 3 is hinged on the back surface of the main body cabinet section 1 so as to be turned to cover the input section 2. Thus, the flip-up lid 3 protects the input section 2 and liquid crystal display section 4 when the electronic dictionary is carried around. Also, the main body cabinet section 1 encloses a power source section and the like for supplying a power source to necessary portions, such as a control circuit for controlling the interface and the like.

The input section 2 includes various kinds of keys and switches: a set of alphabet keys 21 through which the user enters characters, a menu key 22 which is pressed down by the user when he wishes to display a setting menu for various kinds of setting, a set of application keys 23 which is pressed down by the user when he selects an application, a power source switch 24 which is pressed down by the user to turn ON/OFF the power source, a set of arrow keys 25 which are used when the user wishes to move the cursor up/down/right/left directions, an enter key 26, and a function key 27 which is pressed down by the user when he selects a function, a CE key 28, etc.

Figure 1:
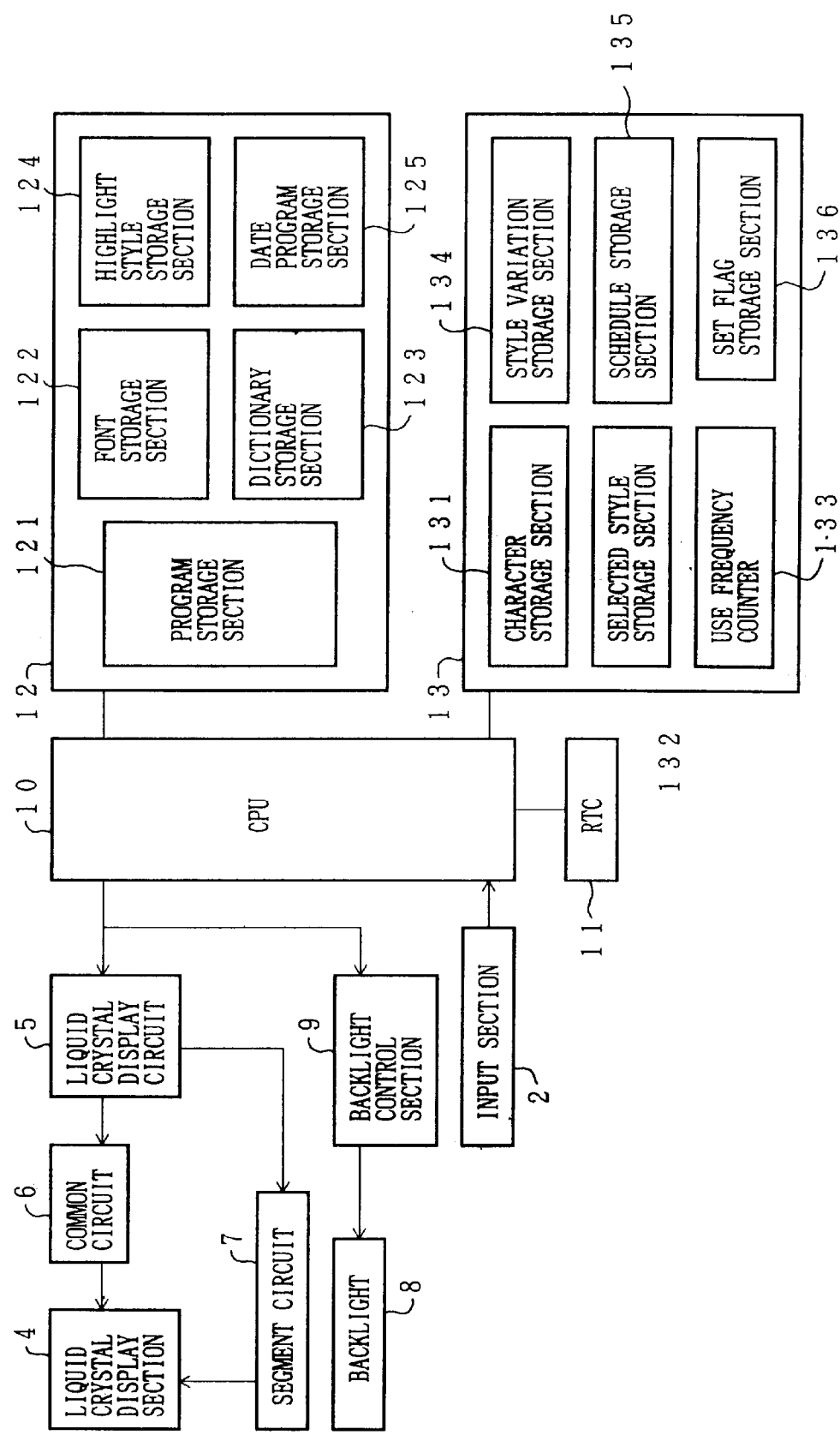
FIG. 1 is a block diagram schematically showing an arrangement of a control system of an electronic dictionary in accordance with an example embodiment of the present invention.

FIG. 1 is a block diagram schematically showing a control system of the above electronic dictionary.

The electronic dictionary includes a liquid crystal display circuit 5, a common circuit 6, and a segment circuit 7 to control the display on the liquid crystal display section 4. The liquid crystal display circuit 5 stores each dot position in the liquid crystal display section 4 as a bit map, and sends a signal to the common circuit 6 and segment circuit 7 to control the ON/OFF of the dot display by controlling the liquid crystal residing at each dot position. The electronic dictionary also comprises a backlight 8 for irradiating the liquid crystal display section 4 from behind. The light ON/OFF action of the backlight 8 is controlled by a backlight control section 9.

The electronic dictionary further comprises a CPU (Central Processing Unit) 10, an RTC (Real Time Clock) 11, a ROM (Read Only Memory) 12, and a RAM (Random Access Memory) 13. The CPU 10 controls an overall operation of the electronic dictionary. The RTC 11 counts up a time based on an unillustrated clock signal.

The ROM 12 is composed of a plurality of areas into which various kinds of programs and information are written in advance. The ROM 12 includes, for example, a program storage section 121 for storing a program describing an operation of the CPU 10, a font storage section 122 for storing font variations of the characters displayable on the liquid crystal display section 4, a dictionary storage section 123 for storing dictionary information, a highlight style storage section 124 for storing a variety of styles for the highlight display as bit map data, and a date program storage section 125 for storing calendar information for date computation.

The RAM 13 is composed of a plurality of areas into which data entered by the user and various kinds of other data are stored. The RAM 13 includes, for example, a character storage section 131 for storing character information, such as a sentence the user has entered through the input section 2, a selected style storage section 132 for storing a style selected to be used next when the attribute information is displayed (which will be detailed below), a use frequency counter 133 for counting for how many items each style is used, a style variation storage section 134 for storing a variety of styles applied to the items, a schedule storage section 135 for storing schedule data, a set flag storage section 136 for storing whether the user has set a normal or highlight display for each item, etc.

Here, a manipulating method and an operation of the electronic dictionary of the present embodiment will be explained with reference to FIGS. 3(a) and 3(b) and FIG. 4. Besides the dictionary function, the electronic dictionary of the present embodiment is furnished with a clock function, a schedule managing function, a calendar function, etc., and the user can select the function he wishes to use by pressing down an appropriate key of the application keys 23 of the input section 2. In the following, the explanation related to the dictionary function will be given.

To begin with, the user lifts up the flip-up lid 3 with respect to the main body cabinet 1, and presses down the power source switch 24 of the input section 2 to turn ON the power source. Note that the present electronic dictionary is provided with a resume function, and as soon as the power source is turned ON, a screen which was displayed right before the power source was turned OFF is resumed on the liquid crystal display section 4.

Then, when the user selects the dictionary function using the appropriate key of the application keys 23 of the input section 2, the CPU 10 starts to run a program to carry out the dictionary function, whereupon a headword input screen shown in FIG. 3(a) is displayed on the display screen of the liquid crystal display section 4. Here, a message instructing the user to enter a headword he wishes to retrieve is displayed on the display screen. Accordingly, the user enters the headword using alphabet keys 21 of the input section 2.

The electronic dictionary of the present embodiment stores the headwords and attribute information related to the headwords in the dictionary storage section 123 in the ROM 12. The attribute information referred herein includes six items: a pronunciation, a phrasal verb, an idiom, a synonym, an antonym, and a usage. Note that, however, the kinds and the number of the items are not limited to the above examples. As previously mentioned, when the user enters the headword of a word he wishes to retrieve, for example, "clear", using the alphabet keys 21 of the input section 2, the headword is retrieved from the dictionary storage section 123.

When the retrieval ends, the headword "clear" is displayed at the top, and the attribute information of the headword retrieved from the dictionary storage section 123 is displayed below the headword as shown in FIG. 3(b). When there is too much display content, only a screenful portion is displayed on the display screen of the liquid crystal display section 4 at one time, and the rest is displayed as the user scrolls the display screen.

The electronic dictionary of the present embodiment is arranged to make the display screen easier to see. To be more specific, the present electronic dictionary is arranged to highlight a specific item the user has selected to be readily distinguished from the other non-selected items, and also to highlight a plurality of items using a variety of styles, so that one highlighted item can be distinguished from another highlighted item when the user has selected more than one item.

For example, FIG. 3(b) shows an example display of the display screen when the user has selected four items for the highlight display: the pronunciation, phrasal verb, synonym, and antonym. Here, the pronunciation is displayed on a solidly shade in red in the line following the headword "clear". "Displayed on a solidly shade" means at a character is superimposed on a solidly shade in a highlight color while leaving the character legible. A phrasal verb of the headword "clear", namely, "clear out", is displayed with its first character on a solid shade in red and the second to the last characters underlined in red. Each of the synonyms of the headword "clear", namely, "obvious", "limpid", "lucid", "pellucid", and "transparent", is displayed within a red frame. The antonym of the headword "clear", namely, "opaque" is half underlined in red.

In other words, the selected items are highlighted by being displayed in red, and can be distinguished from the other non-selected items. Further, using a variety of styles, such as superimposing either an entire or part of a character string on a solid shade in red, underlining or half underlining a character string in red, and placing a character string within a red frame, makes it possible to highlight each selected item to be distinguished from the other selected items. It is needless to say that the styles for the highlight display, such as the solid shade, underline, and half underline, are applied in such a manner not to make the character string of the attribute information illegible.

Next, now the user selects an item he wishes to highlight will be explained in the following.

Although it is not shown in any of the accompanying drawings, when the user presses down the menu key 22 of the input section 2, a set menu for various kinds of setting is displayed. When the user selects "highlight item setting", a highlight item setting screen as shown in FIG. 4 is displayed on the liquid crystal display section 4. A list of the items of the attribute information is displayed on the left side of the highlight item setting screen. Also, capital letters "B" and "R" are displayed for each item on the right side. The user can select whether the item in question should be displayed in black (B) in the normal display or red (R) in the highlight display by selecting "B" or "R".

Which of the normal display or highlight display has been set for each item can be readily understood because "B" or "R" is displayed with a reversed background as per selection. For example, the highlight item setting screen of FIG. 4 shows a state that four items, namely, the pronunciation, phrasal verb, synonym, and antonym, are selected for the highlight display, and the rest of two items, namely, idioms and usage, are selected for the normal display.

The user changes the setting for each item in the following manner. To begin with, the user moves the cursor to the item he wishes to change on the highlight item setting screen using the up arrow key or down arrow key of the arrow keys 25. Then, the user selects either "B" or "R" using the left arrow key or right arrow key of the arrow keys 25.

Here, the operation of the CPU 10 associated with the user's manipulation of the arrow keys 25 will be explained with reference to the flowchart of FIG. 5.

To begin with, the CPU 10 checks whether the user has selected the dictionary function or not (Step 1, hereinafter, Step is abbreviated to S). When the dictionary function is selected in S1, the CPU 10 proceeds to S2, whereby the headword input screen of FIG. 3(a) is displayed. Then, the CPU 10 checks whether the user has pressed down the key 22 or not (S3). When the user has not pressed down the menu key 22, the CPU 10 ends the operation; otherwise, the CPU 10 reads out the content set for each item from the style variation storage section 134 in the RAM 13, and displays the same in the form of the highlight item setting screen of FIG. 4 (S4).

Then, the CPU 10 checks whether the user has pressed down the up arrow key of the arrow keys 25 or not (S5). When the user has not pressed down the up arrow key, the CPU 10 proceeds to S8; otherwise, the CPU 10 further checks whether the cursor is moved to the first item on the highlight item setting screen or not (S6) When the cursor is moved to the first item, the CPU 10 returns to SS; otherwise, the CPU 10 moves up the cursor to the item in the previous line on the highlight item setting screen (S7).

Then, the CPU 10 checks whether the user has pressed down the down arrow key of the arrow keys 25 or not (S8) When the user has not pressed down the down arrow key, the CPU 10 proceeds to S11; otherwise, the CPU 10 further checks whether the cursor is moved down to the last item on the highlight item setting screen or not (S9). When the cursor is moved down to the bottom, the CPU 10 returns to S5; otherwise, the CPU 10 moves down the cursor to the next item in the following line on the highlight item setting screen (S10)

Then, the CPU 10 checks whether the user has pressed down the right arrow key of the arrow keys 25 or not (S11). When the user has not pressed down the right arrow key, the CPU 10 proceeds to S15; otherwise, the CPU 10 further checks whether the cursor is on "B" or "R" displayed at the right side of each item on the highlight item setting screen (S12). When the cursor is on "R", the CPU 10 returns to S5, and when the cursor is on "B", the CPU 10 moves the cursor to "R" (S13). Further, the CPU 10 sets a value "1" to the flag in the set flag storage section in the RAM 13 for the item on which the cursor is currently positioned on the highlight setting screen (S14), whereby the highlight display is set for the item in question.

Then, the CPU 10 checks whether the user has pressed down the left arrow key of the arrow keys 25 or not (S15). When the user has not pressed down the left arrow key, the CPU 10 proceeds to S19; otherwise, the CPU 10 further checks whether the cursor is on "B" on the highlight item setting screen or not (S16). When the cursor is on "B", the CPU 10 returns to S5; otherwise, the CPU 10 moves the cursor to the left to be on "B" (S17). Further, the CPU 10 sets a value "0" to the flag in the set flag storage section 136 in the RAM 13 for the item on which the cursor is currently positioned on the highlight setting screen (S18), whereby the highlight display for the item in question is reset.

When the user has not pressed down any of the arrow keys 25, the CPU 10 skips to S19. Then, the CPU 10 checks whether the user has pressed down the enter key 26 or not (S19). When the user has not pressed down the enter key 26, the CPU 10 returns to S5; otherwise the CPU 10 proceeds to S20. Then, the CPU 10 erases the highlight item setting screen from the display screen of the liquid crystal display section 4 (S20), and returns to S2. In this manner, the highlight display is selectively set for the arbitrary item(s) in response to the user's key manipulation.

Next, the highlight display by the electronic dictionary of the present embodiment will be further detailed in the following with reference to FIGS. 6 through 8. As has been explained, the present electronic dictionary highlights the display of the items selected by the user in red. However, besides merely displaying all the selected items in red, the present electronic dictionary is characterized by highlighting the selected items differently using first through fourth styles set forth below to make the displayed information easier to see when the user has selected more than one item:

(1) superimposing an entire character string of the attribute information on a solid shade in red;

(2) superimposing the first character of the character string of the attribute information on a solid shade in red, and underlining the second to the last characters in red;

(3) placing the character string of attribute information within a red frame; and (4) half underlining the character string of attribute information in red.

Note that if the user has selected five or more items, at least one of the above four styles is used twice. Although it will be explained in detail below, each time the user selects a new item for the highlight display, which style should be used for the newly selected item can be determined appropriately so as to use each style at substantially the same frequency.

Figure 6:
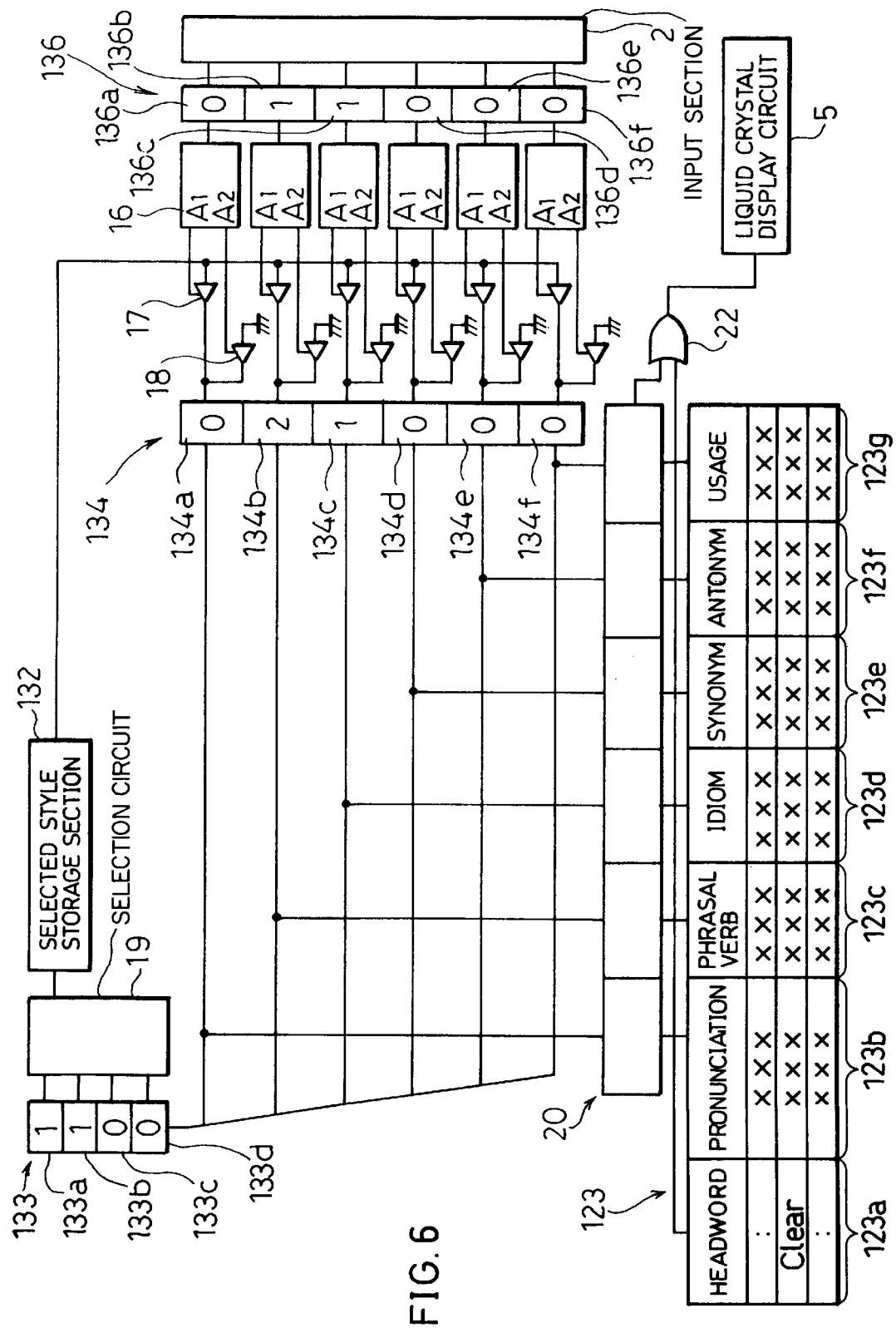
FIG. 6 is a block diagram schematically showing an arrangement to realize a highlight display using more than one style in the above electronic dictionary.

FIG. 6 is a block diagram schematically showing an arrangement to realize a highlight display using more than one style in the present electronic dictionary.

As is shown in the drawing, the dictionary storage section 123 in the ROM 12 is composed of a headword region 123a, and attribute information regions 123b through 123g into which six items of the attribute information of the headword, namely, the pronunciation, phrasal verb, idiom, synonym, antonym, and usage, are stored, respectively.

In addition, the selected style storage section 132, use frequency counter 133, style variation storage section 134, and set flag storage section 136 are used to realize the above function.

The set flag storage section 136 has six flags 136a through 136f which correspond to the above six items of the attribute information, respectively. That is, the flags 136a through 136f correspond to the pronunciation, phrasal verb, idiom, synonyms, antonym, and usage, respectively. Among the flags 136a through 136f, a value "1" is set to the flag that corresponds to the item the user has selected for the highlight display, and a value "0" is set to the flag that corresponds to the item the user has selected for the normal display.

Likewise, the style variation storage section 134 has six flags 134a through 134f which correspond to the above six items, respectively. The flags 134a through 134f indicate the specific styles used for their corresponding items. For example, a value "1" is set to the flag that corresponds to the item displayed in the first style, and a value "2" is set to the flag that corresponds to the item displayed in the second style. Note that a value "0" is set to the flag that corresponds to the item for which the normal display is set.

The use frequency counter 133 includes as many counters as the style variations. Thus, the use frequency counter 133 has four counters 133a through 133d which correspond to the above first through fourth styles, respectively, thereby indicating for how many items each style is used.

A selection circuit 19 checks the counters 133a, 133b, 133c, and 133d of the use frequency counter 133 in alphabetical order, and selects the counter having the least count value. Then, the selection circuit 19 outputs a value representing the style corresponding to the selected counter to the selected style storage section 132. For example, if the counter 133b corresponding to the second style has the least value, the selection circuit 19 outputs a value "2" to the selected style storage section 132. Then, the selection circuit 19 withholds the value outputted from the selection circuit 19.

The set flag storage section 136 is connected to a one-shot trigger circuit 16, which is realized by a monostable multivibrator or the like for detecting the rising edge and falling edge of the input pulse. The one-shot trigger circuit 16 has two output terminals $A_1$ and $A_2$. When each flag in the set flag storage section 136 is reset to "1" from "0", the one-shot trigger circuit 16 outputs a signal from the output terminal $A_1$ for a short period. On the other hand, when each flag is reset to "0" from "1", the one-shot trigger circuit 16 outputs a signal from the other output terminal $A_2$ for a short period.

The output terminal $A_1$ of the one-shot trigger circuit 16 is connected to one of the two input terminals of a gate 17, and the output terminal $A_2$ is connected to one of the two input terminals of a gate 18. The other input terminal of the gate 17 is connected to the selected style storage section 132, and the other input terminal of the gate 18 is connected to the ground.

The gate 17 is opened when the signal is outputted from the output terminal $A_1$ of the one-shot trigger circuit 16, and the value withheld in the selected style storage section 132 and representing the style, namely, any of the values "1" through "4", is outputted to the style variation storage section 134. On the other hand, the gate 18 is opened when the signal is outputted from the output terminal $A_2$. Here, since a signal from the ground is outputted, a value "0" representing the normal display (black display) is stored into the style variation storage section 134.

A synthesis processing section 20 is a part of the CPU 10. The synthesis processing section 20 obtains two kinds of display data: one is the display data of the style for the highlight display corresponding to the value stored in the highlight style storage section 124 in the ROM 12, and the other is the display data of the attribute information obtained from the dictionary storage section 123 in the ROM 12. Then, the synthesis processing section 20 synthesizes the above two kinds of display data and outputs the resulting synthesis display data to the liquid crystal display circuit 5, whereby the attribute information is highlighted on the liquid crystal display section 4.

Next, an operation of the electronic dictionary when the user has changed the setting of the display state of the attribute information will be explained.

Assume that, as shown in FIG. 6, values "0", "1", "1", "0", "0", and "0" are set to the flags 136a through 136f of the set flag storage section 136, respectively, and values "1", "1", "0", and "0" are set to the counters 133a through 133d of the use frequency counter 133, respectively. This indicates that the user has set the highlight display for the two items, namely, phrasal verb and idiom, so as to be distinguished from the other non-selected items.

Under these conditions, the selection circuit 19 finds the counter having the least count value in the use frequency counter 133, and selects the counter 133c having a count value "0", and outputs a value "3" representing the style corresponding to the counter 133c, namely, the third style, to the selected style storage section 132, and the outputted value is withheld therein.

Assume that the user changed the setting of the antonym from "B" to "R" on the aforementioned highlight item setting screen to highlight the antonym in addition to the above two items. Then, the corresponding flag 136e of the set flag storage section 136 is reset to "1" from "0", whereupon the signal is outputted from the output terminal $A_1$ of the one-shot trigger circuit 16.

Accordingly, the gate 17 is opened, and the value "3" withheld in the selected style storage section 132 and representing the style is outputted to the flag 134e of the style variation storage 134, whereby the value "3" is set in the flag 134e. Concurrently, the signal is outputted from the style variation storage section 134 to the use frequency counter 133, so that a value "1" is added to the counter 133c corresponding to the third style.

According to the above operation, when a headword is retrieved next time, the attribute information of antonym is highlighted in the third style, namely, being placed within a red frame, on the liquid crystal display section 4.

Next, an operation of the electronic dictionary when the user resets the highlight display set for the idiom will be explained.

When the user changes the setting of the idiom from "R" to "B" on the highlight item setting screen, the flag 136c of the set flag storage section 136 is reset to "0" from "1", whereupon the short-term signal is outputted from the output terminal $A_2$ of the one-shot trigger circuit 16 and the gate 18 is opened. Here, since the gate 18 is connected to the ground, a value "0" is outputted to the flag 134c of the style variation storage section 134 to be set therein.

In responding to the above operation, a signal indicating that the content of the flag 134c is changed to "0" from "1" is sent to the use frequency counter 133 from the style variation storage section 134, whereby the use frequency counter 133 decreases a value "1" from the content of the counter 133a corresponding to the first style. According to the above operation, when a headword is retrieved next time, the idiom is displayed in black in the normal display.

Further, assume that the user has changed the setting of the synonym from "B" to "R" on the highlight item setting screen to change the display state of the synonym from the normal display to the highlight display. Note that, at this point, the counter 133a of the use frequency counter 133 has a value "0" because the content of the same is decreased by "1" in the above operation. Since the selection circuit 19 selects the counter having the least value among the counters 133a through 133d in alphabetical order, the counter 133a corresponding to the first style is selected here in. Then, a value "1" representing the style corresponding to the counter 133a is outputted from the selection circuit 19 to the selected style storage section 132 and withheld therein. Accordingly, the first style is used for the synonym for which the user has set the highlight display.

Figure 5:
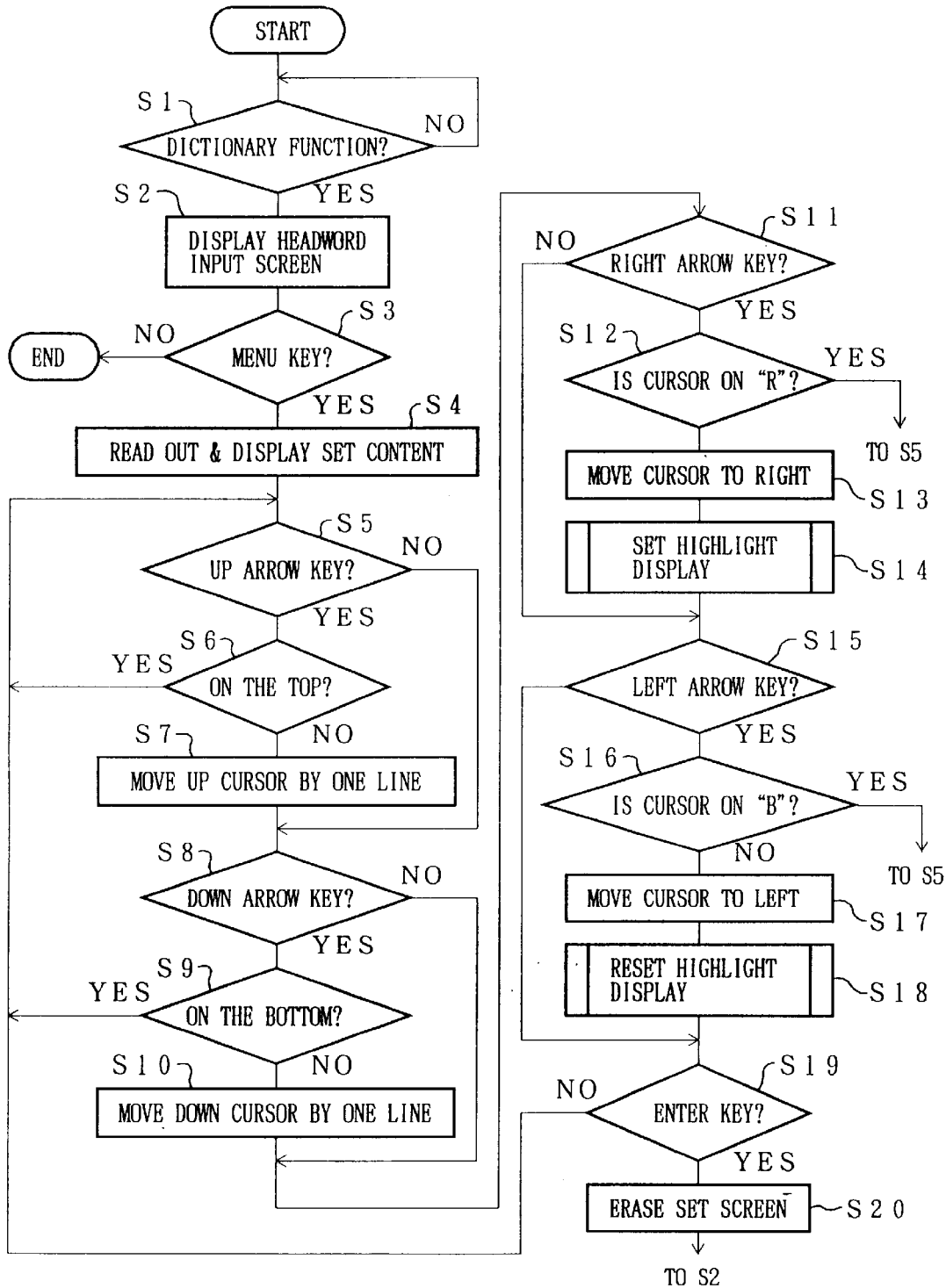
FIG. 5 is a flowchart detailing an operation of a central processing section in response to a user's key manipulation with the above highlight item setting screen.
Figure 7:
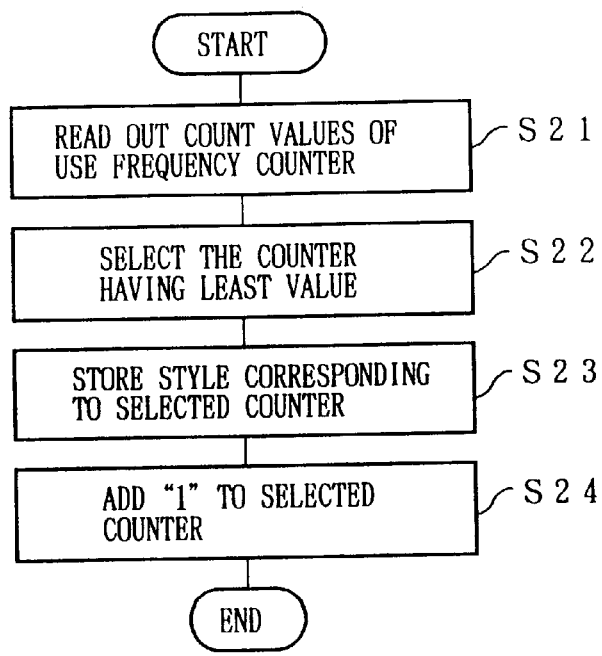
FIG. 7 is a flowchart detailing a highlight display setting process in S14 of the flowchart of FIG. 5.

FIG. 7 shows a flowchart detailing S14 of the flowchart of FIG. 5 for the highlight display setting process. As shown in FIG. 7, to set the highlight display, the CPU 10 reads out the count values of the use frequency counter 133 in the RAM 13 representing the use frequency of their respective styles (S21), and selects the counter having the least count value (S22). In case that more than one counter has the least value, the CPU 10 selects only one counter in order of a predetermined priority. Then, the style corresponding to the selected counter is stored into the style variation storage section 134 (S23), and a value "1" is added to the selected counter in the use frequency counter 133 (S24)

Figure 8:
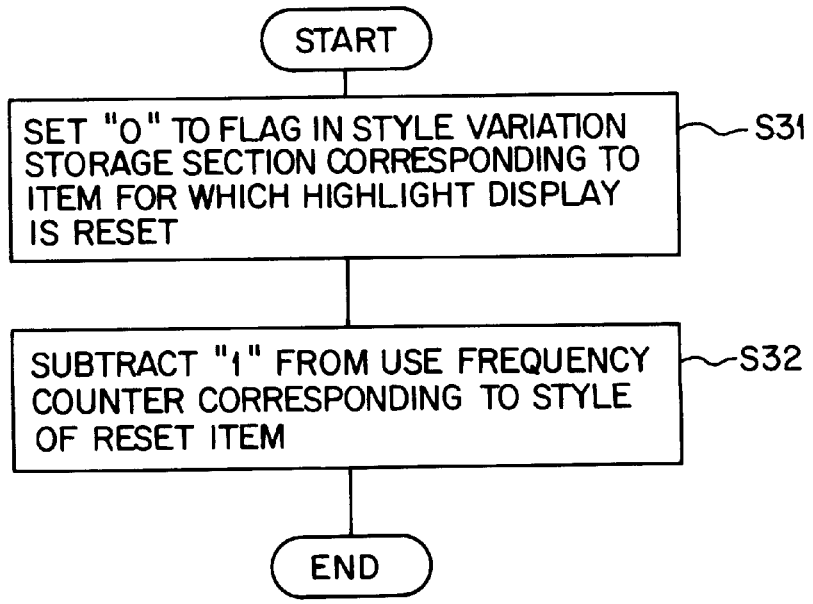
FIG. 8 is a flowchart detailing a highlight display resetting process in S18 of the flowchart in FIG. 5.
Figure 9:
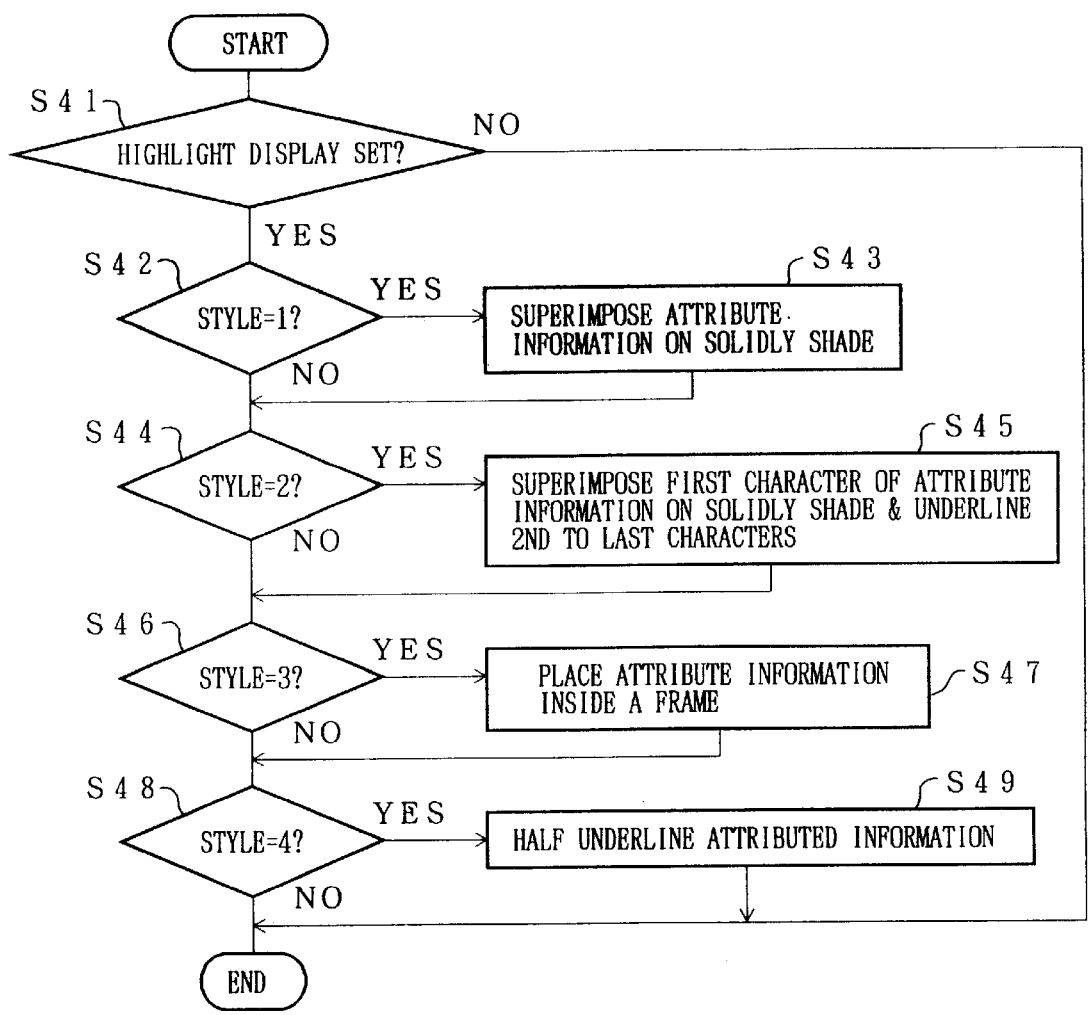
FIG. 9 is a flowchart detailing an operation of a synthesis processing section after the style for the highlight display is selected for each item.

FIG. 8 is a flowchart detailing S18 of the flowchart of FIG. 5 for the highlight display resetting process. As shown in FIG. 8, to reset the highlight display setting, a value "0" is set to the flag in the style variation storage section 134 in the RAM 13 which corresponds to the item for which the highlight display setting is reset (S31). Then, a value "1" is subtracted from the value of the counter in the use frequency counter 133 corresponding to the style used for the item to which the highlight display is reset (S32).

As has been explained, when the style for the highlight display is set to each item, the synthesis processing section 20 displays the attribute information in the set style. In the following, the operation of the synthesis processing section 20 will be explained with reference to the flowchart of FIG. 9.

To begin with, the synthesis processing section 20 checks whether the highlight display is set for each item or not (S41). When the highlight display is not set for the item in question, the synthesis processing section 20 does not take any action and ends the operation. When the highlight display is set for the item in question, the synthesis processing section 20 further checks whether the value representing the style of the item in question is "1" or not (S42). When the value is "1", the synthesis processing section 20 displays the character string of the attribute information of the item in question in the first style, that is, by superimposing the character string on a solid shade in red (S43) When the value is not "1" in S42, the synthesis processing section 20 proceeds to S44.

Then, the synthesis processing section 20 checks whether the value is "2" or not (S44). When the value is "2", the synthesis processing section 20 displays the character string of the attribute information by superimposing its first character on a solid shade in red and underlining the second to the last characters (S45). When the value is not "2" in S44, the synthesis processing section 20 proceeds to S46.

Then, the synthesis processing section 20 checks whether the value is "3" or not (S46). When the value is "3", the synthesis processing section 20 displays the character string of the attribute information within a red frame (S47). When the value is not "3" in S46, the synthesis processing section 20 proceeds to S48.

Then, the synthesis processing section 20 checks whether the value is "4" or not (S48). When the value is "4", the synthesis processing section 20 displays the character string of the attribute information with a half underline in red (S49). When the value is not "4" in S48, the synthesis processing section 20 does not take any action and ends the operation.

As has been explained, according to the arrangement of the present embodiment, the item for which the user has set the highlight display is highlighted in red so as to be readily distinguished from the other items displayed in black in the normal display. Consequently, when a large quantity of character data like a headword and its attribute information in a dictionary are displayed on the screen, the item the user needs most can be displayed in a distinguished manner from the others.

If the highlight display is set for more than one item, one item can be readily distinguished from another because each item is highlighted differently using a variety of styles, such as the superimposition on a solidly shade, underline, and half underline, or a combination thereof.

In general, two colors, namely, black and red, are used to realize a variety of styles. Thus, a dichroic liquid crystal display can be adopted as the liquid crystal display section 4. Therefore, the present invention is advantageous in that an electronic dictionary which displays the dictionary data in a easy-to-see manner can be provided at a lower cost compared with an electronic dictionary using a full-color liquid crystal display.

Further, the style for the highlight display is not pre-determined for each item, but one style is selectively assigned to an item each time the user has set the highlight display for the item. Thus, a specific style does not have to be pre-determined for each item, and only an adequate number of styles with respect to the number of items has to prepared. Consequently, a plurality of items can be readily distinguished from each other using fewer styles, thereby saving a memory capacity of the highlight style storage section 124 for storing the display data of each style for the highlight display.

Moreover, since a style which has been used least frequently is assigned, a possibility of using the same style for a plurality of items can be minimized. Thus, it has become possible to provide a display on which the user can easily find the information he needs most.

In the above explanation, the example highlight display using the first through fourth styles was explained. However, another style can be used as a fifth style. In the fifth style, a blank space of a solid shade in red is inserted at the head of the attribute information, and an entire character string of the attribute information is underlined in red, for example. The fifth style can highlight the character string without reducing visibility compared with a style of superimposing the entire character string on a solid shade. Note that, however, the styles are not limited to the above five examples, and any style will do as long as the character string is highlighted without causing any damage on the visibility of the original character information.

Here, the arrangement and operation of the synthesis processing section 20 to realize the highlight display using the second and fifth styles will be explained.

Figure 11:
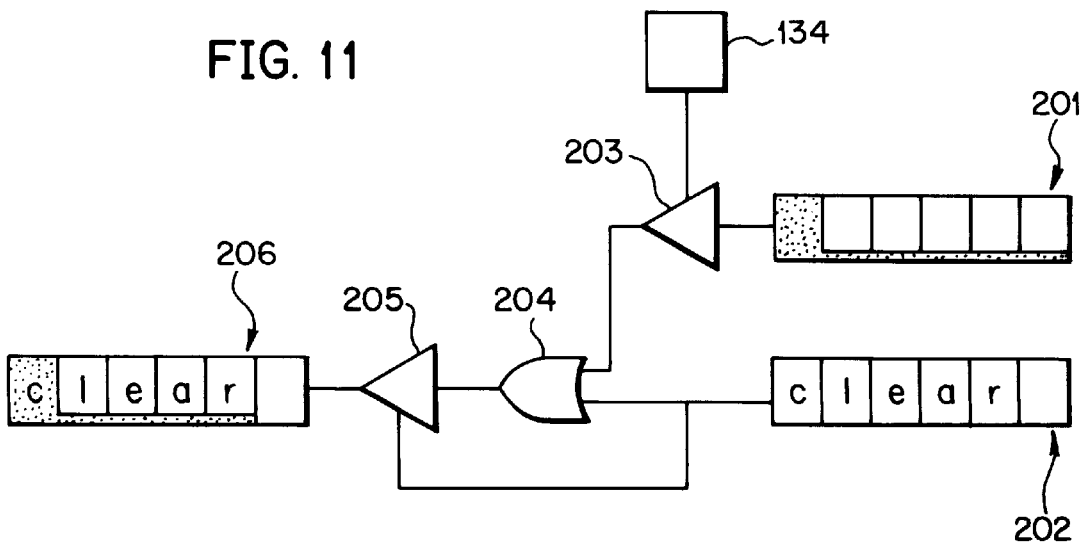
FIG. 11 is an explanatory view illustrating an example arrangement of the synthesis processing section to realize the highlight display using the second style.
Figure 12:
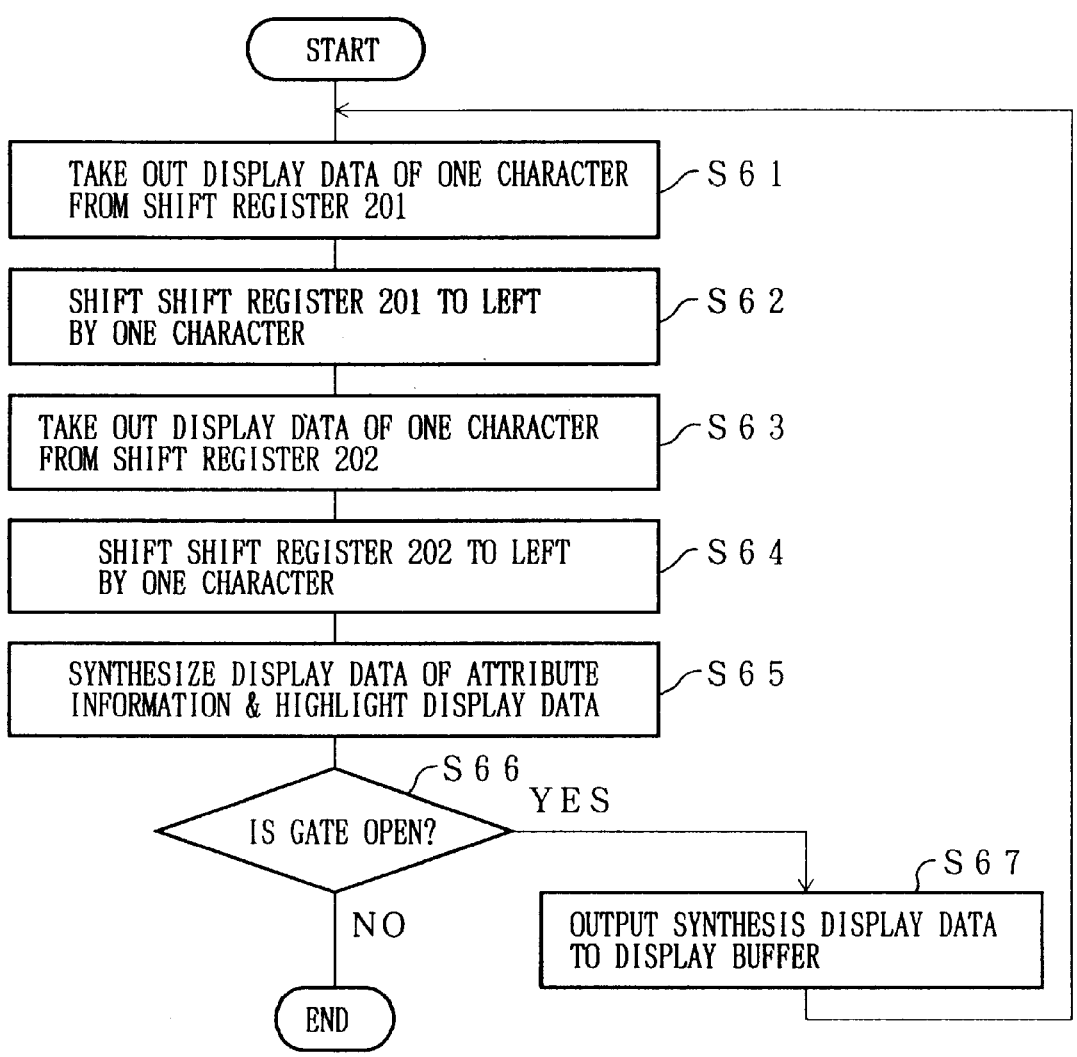
FIG. 12 is a flowchart detailing an operation of the synthesis processing section to realize the highlight display using the second style.

To begin with, the second style will be explained based on FIGS. 10 through 12. In the second style, the first character of the character string of the attribute information is super-imposed on a solid shade in red, and the second to the last characters ar e underlined. According to this style, the original attribute information can be highlighted without reducing the visibility compared with, for example, the first style in which the entire character string of the attribute information is superimposed on a solid shade in red.

Figure 10:
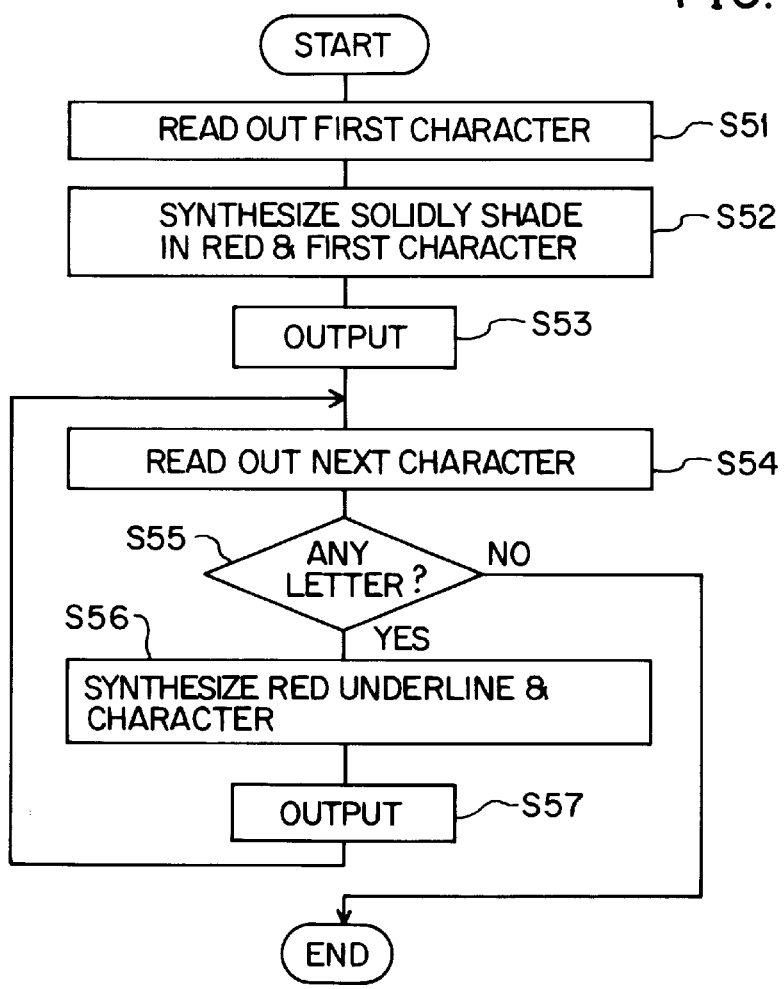
FIG. 10 is a flowchart detailing a procedure of a highlight display using a second style.

The procedure of the highlight display using the second style will be detailed by the flowchart in FIG. 10. To begin with, the synthesis processing section 20 reads out the display data of the first character of the attribute information (S51), and synthesizes the readout display data and the display data of a blank space of a solid shade in red (S52). Then, the resulting synthesis display data are outputted to the liquid crystal display circuit 5 (S53).

Then, the next character of the attribute information is read out (S54), and whether any letter other than a blank space is read out or not is judged (S55). When the judging result is YES in S55, the synthesis processing section 20 synthesizes the display data of the readout letter and the display data of the red underline (S56), and outputs the resulting synthesis display data to the liquid crystal display circuit 5 (S57). When the judging result is NO in S55, the synthesis processing section 20 ends the operation.

An example arrangement of the synthesis processing section 20 and the like to realize the above operation will be explained more in detail with reference to FIG. 11. As previously mentioned, the present electronic dictionary stores the display data for each style in the display style storage section 124 in the ROM 12. The display data are taken out from the highlight style storage section 124 by the synthesis processing section 20, and stored into a shift register 201 provided in the synthesis processing section 20 as shown in FIG. 11. In other words, the display data of a solidly shade in red for one character are stored at the top of the shift register 201 followed by the display data of the red underline for five characters.

On the other hand, the display data of the attribute information taken out from the dictionary storage section 123 in the ROM 12 are stored into a shift register 202 also provided in the synthesis processing section 20. Assume that a character string "clear" is stored into the shift register 202 as the attribute information.

The shift register 201 is connected to a gate 203. The gate 203 is connected to the style variation storage section 134 in the RAM 13, and opened when a value "2" representing the second style is inputted from the style variation storage section 134.

In other words, when the gate 203 is opened upon receipt of the value "2" from the style variation storage section 134 in the RAM 13 as a signal, the display data respectively stored in the shift registers 201 and 202 are sent to an OR circuit 204 in sync with each other. Then, the OR circuit 204 synthesizes the above two kinds of display data and outputs the resulting synthesis display data to a display buffer 206 through a gate 205.

Note that the gate 205 is a gate that closes or opens depending on whether a letter is stored in the shift register 202 or not. In other words, the gate 205 closes when the shift register 202 receives data with no letter. According to this arrangement, even if the number of characters of the attribute information is smaller than the number of characters of the display data corresponding to a solid shade in red for the first character and the underline for the second to the last characters, no underlined blank will be displayed after the attribute information.

Here, the operation of the above-arranged synthesis processing section 20 will be explained based on the flowchart of FIG. 12.

To begin with, after the gate 203 is opened upon receipt of the value "2" representing the second style from the style variation storage section 134, the synthesis processing section 20 takes out the display data of one character from the shift register 201 storing the display data of the second style (S61), whereby the display data for a solid shade in red are taken out. Then, the synthesis processing section 20 shifts the shift register 201 to the left by one character (S62).

Further, the synthesis processing section 20 takes out the display data of one character from the shift register 202 storing the attribute information (S63), whereby the display data of a small letter "c", the first character in the character string "clear", are taken out. Then, the synthesis processing section 20 shifts the shift register 202 to the left by one character (S64).

Next, the synthesis processing section 20 synthesizes the display data of "c" taken out from the shift register 202 and the display data of a solidly shade in red of one character read out from the shift register 201 by means of the OR circuit 204 (S65).

Then, the synthesis processing section 20 checks whether the gate 205 is open or not (S66) When the gate 205 is not open, the synthesis processing section 20 ends the operation. Here, the gate 205 is opened by the display data of "c" of the first character of the attribute information, and the synthesis processing section 20 sets "c" superimposed on a solid shade of red to the display buffer 206 (S67) and returns to S61.

Hereinafter, the synthesis processing section 20 repeats a loop of S61 through S67 to set the characters "l", "e", "a", "r" stored in the shift register 202 to the display buffer 206 sequentially together with the red underline stored in the shift register 201. The gate 205 closes when the shift register 202 has emptied the character information, whereupon the synthesis processing section 20 ends the operation.

According to the above operation, the red underline stored as the sixth character in the shift register 201 is not outputted to the display buffer 206, thereby preventing a redundant underline after the attribute information.

Next, the fifth style will be explained based on FIGS. 13 through 15. In the fifth style, a blank space of a solid shade in red is displayed at the head of the character string of the attribute information, and the entire character string of the attribute information is underlined in red. According to this method, the original attribute information can be highlighted without reducing the visibility compared with the first style in which the entire character string of the attribute information is superimposed on a solid shade in red, for example.

Figure 13:
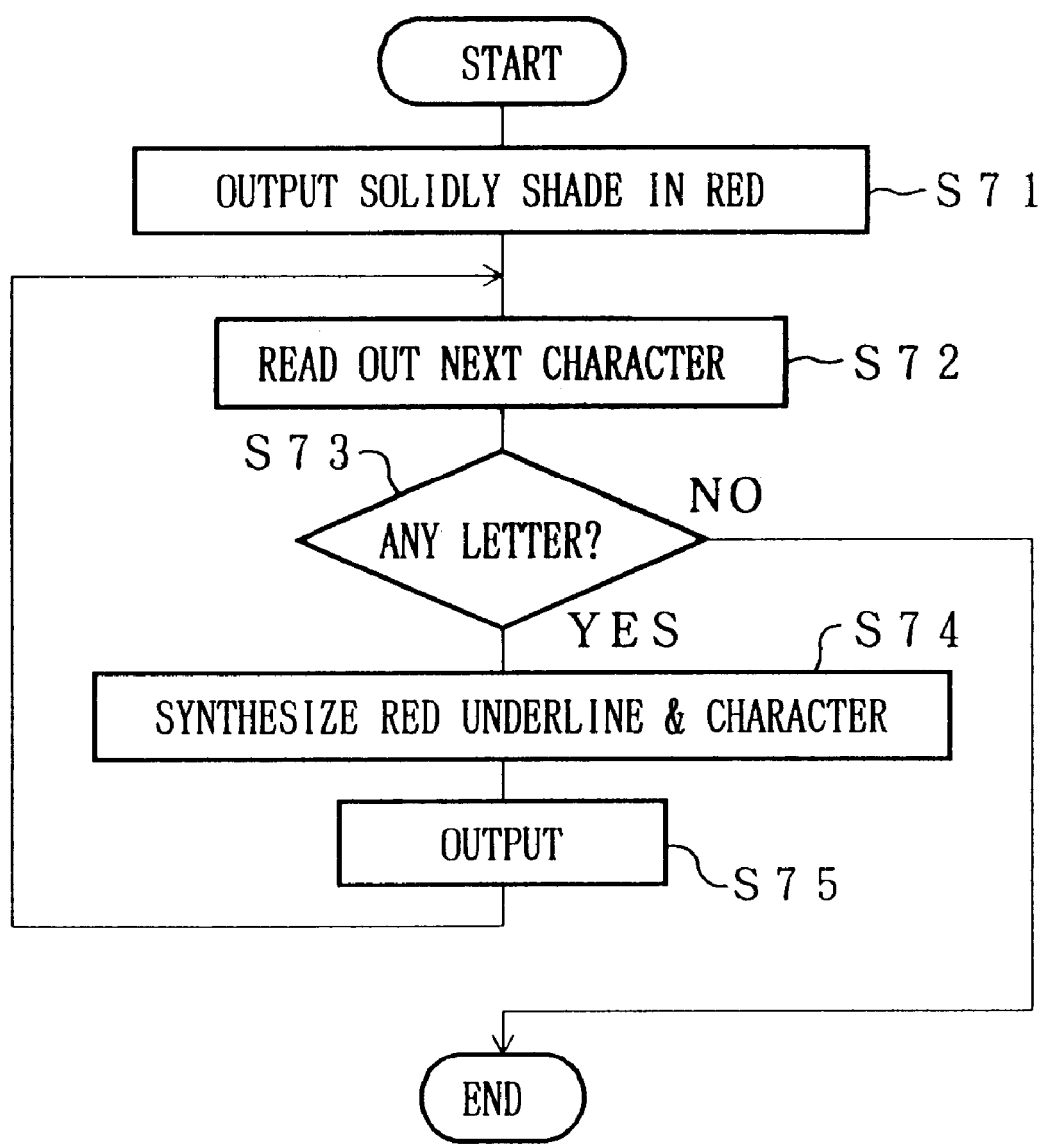
FIG. 13 is a flowchart detailing a procedure of a highlight display using a fifth style.

The procedure of the highlight display using the fifth style is detailed by the flowchart of FIG. 13. More specifically, the synthesis processing section 20 outputs the display data of a blank space of a solidly shade in red to the liquid crystal display circuit 5 (S71). Then, the synthesis processing section 20 reads out the display data of one character in the character string of the attribute information (S72), and checks whether any letter other than a blank space is read out or not (S73). When the judging result is YES in S73, the synthesis processing section 20 synthesizes the display data of the readout letter and the display data of the red underline (S74), and outputs the resulting synthesis display data to the liquid crystal display circuit 5 (S75), after which the synthesis processing circuit 20 returns to S72. When the judging result is NO in S73, the synthesis processing section 20 ends the operation.

Figure 14:
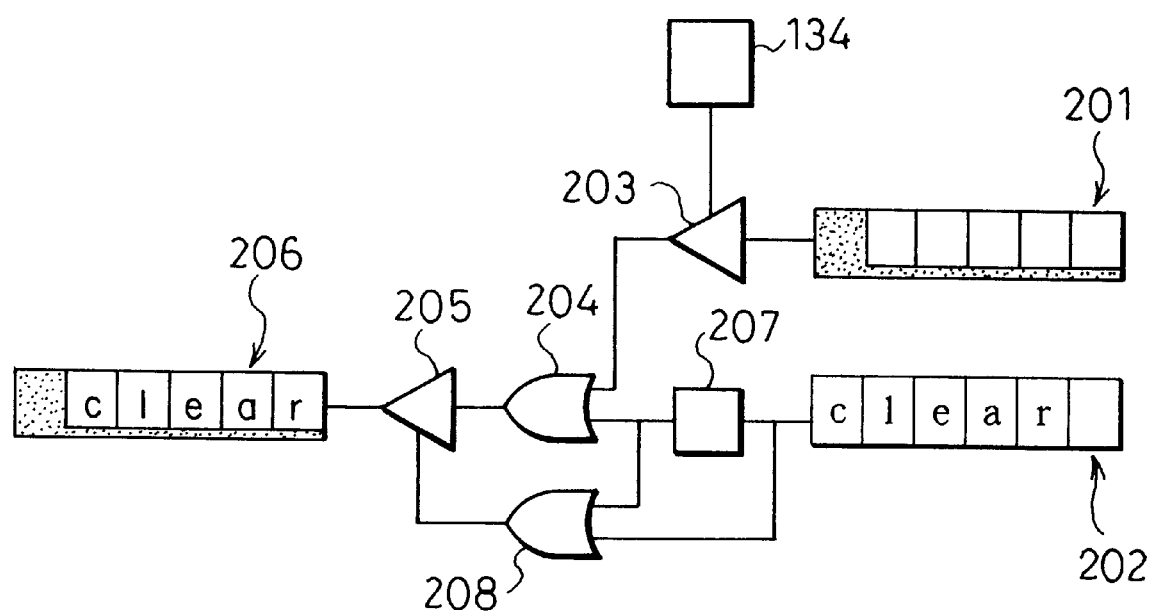
FIG. 14 is an explanatory view showing an example arrangement of the synthesis processing section to realize the highlight display using the fifth style.
Figure 15:
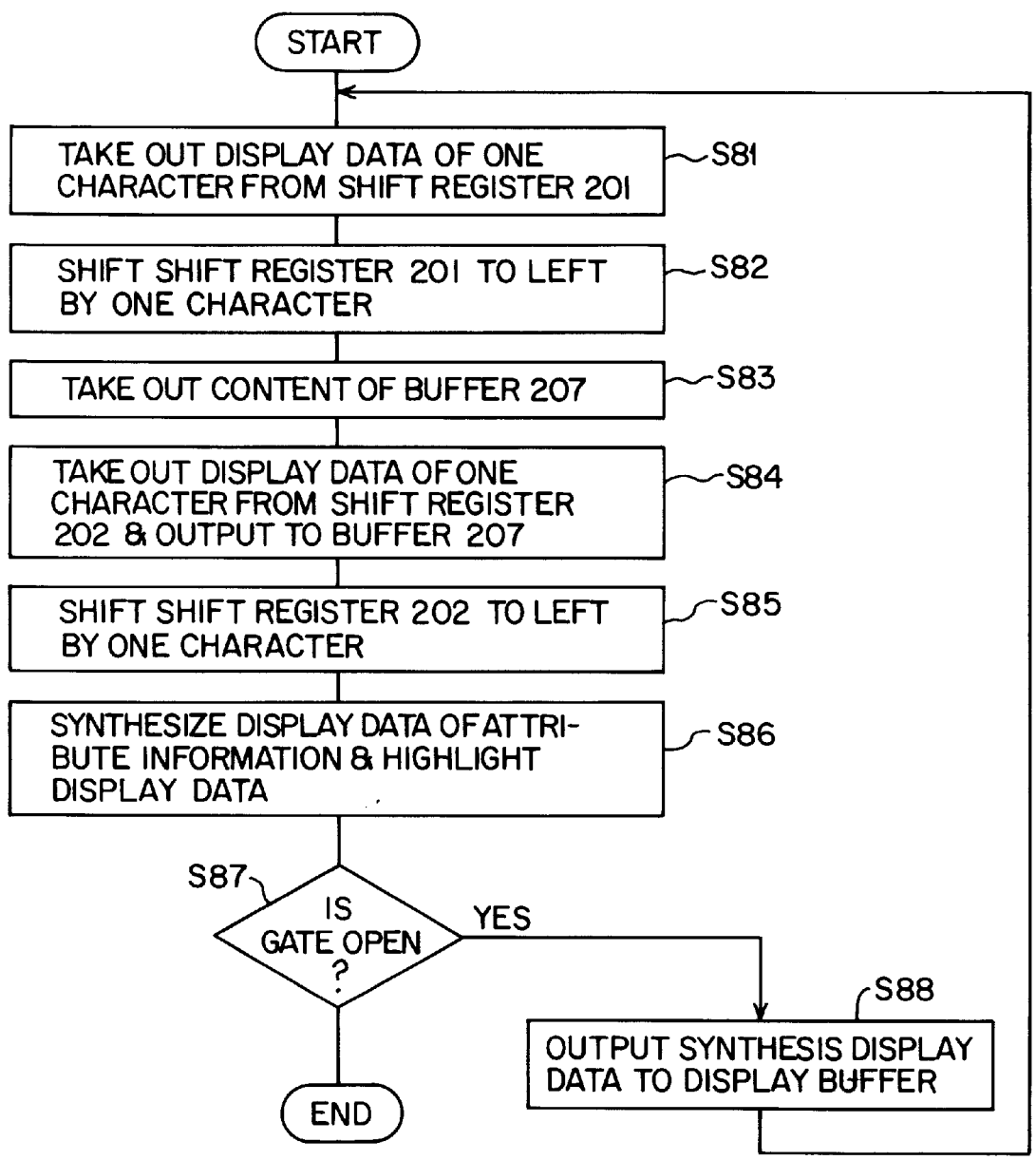
FIG. 15 is a flowchart detailing an operation of the synthesis processing section to realize the highlight display using the fifth style.

FIG. 14 is a block diagram depicting an example arrangement of the synthesis processing section 20 or the like to realize the above style. Comparison with FIGS. 11 and 14 reveals that a buffer 207 is additionally provided between the shift register 202 storing the character string of the attribute information and the OR circuit 204 in the present arrangement, and that another OR circuit 208 is provided for outputting a signal to open the gate 205 only when at least either the shift register 202 or buffer 207 stores a letter.

Here, the operation of the above-arranged synthesis processing section 20 will be detailed with reference to the flowchart of FIG. 15, assuming that the display data of the fifth style, that is, the display data of a solid shade in red of one character and red underline of five characters, are stored into the shift register 201 storing the displayed data of the style for the highlight display, and the character string "clear" is stored in the shift register 202 storing the character string of the attribute information like the above operation.

To begin with, after a value "5" representing the style of the highlight display is outputted to the gate 203 from the style variation storage section 134 and the gate 203 is opened, the synthesis processing section 20 takes out the display data of one character from the shift register 201 storing the display data of the fifth style, and outputs the same to the OR circuit 204 (S81), whereby the display data of a blank space of a solidly shade in red are sent to the OR circuit 204. Then, the synthesis processing sect-ion 20 shifts the shift register 201 to the left by one character (S82).

Then, the synthesis processing section 20 outputs the content in the buffer 207 to the OR circuit 204 (S83). Since the buffer 207 is empty at the beginning, the display data of a blank space are sent to the OR circuit 204. Further, the synthesis processing section 20 takes out the display data of one character from the shift register 202, and outputs the same to the buffer 207 (S84). Then, the synthesis processing section 20 shifts the shift register 202 to the left by one character (S85), whereby a small letter "c", the first character of the character string of the attribute information "clear", is sent to the buffer 207.

Next, the display data of a blank space of a solidly shade in red taken out from the shift register 201 in S81, and the blank space read out from the shift register 202 in S83 are synthesized by the OR circuit 204 (S86).

Then, the synthesis processing section 20 checks whether the gate 205 is open or not again (S87), and ends the operation when the gate 205 is closed. Herein, the gate 205 is open, because the small letter "c" is in the buffer 207 and a character string of "lear" are in the shift register 202. Then, the synthesis processing section 20 outputs the display data of a blank space of a solidly shade in red to the first character space in the display buffer 206 from the OR circuit 204 (S88), and returns to S81.

Hereinafter, the synthesis processing section 20 repeats a loop of S81 through S88, and sets the characters, "c", "l", "e", "a", and "r" stored in the shift register 202 to the buffer 206 sequentially together with the red underline stored in the shift register 201. Finally, the gate 205 closes when the buffer 207 has emptied the character information, whereupon the synthesis processing section 20 ends the operation. Thus, even when the display data of the underline stored in the shift register 201 is longer than the number of characters of the attribute information, no redundant underline is outputted.

As has been explained, according to the arrangement of the present embodiment, the attribute information of the item(s) the user has selected are highlighted in a style different from a style used for the other non-selected item(s). Consequently, it has become possible to realize an electronic dictionary which can display the data the user needs most in a readily distinguishable manner.

In the above explanation, the highlight styles, such as the solid shade, underline, and half underline all in red, or a combination of the same, are appended directly to the attribute information of the item the user has selected. However, the highlight styles may be added to the title of the item that the user has selected, and the attribute information may be displayed in the normal display. Alternatively, the highlight styles may be added to both the title of the item and the attribute information of the item the user has selected.

In the present invention, the dichroic display is used: black is used for the normal display and red is used for the highlight display. However, colors other than red can be used for the highlight display or more than two colors may be used.

Embodiment 2

Figure 16:
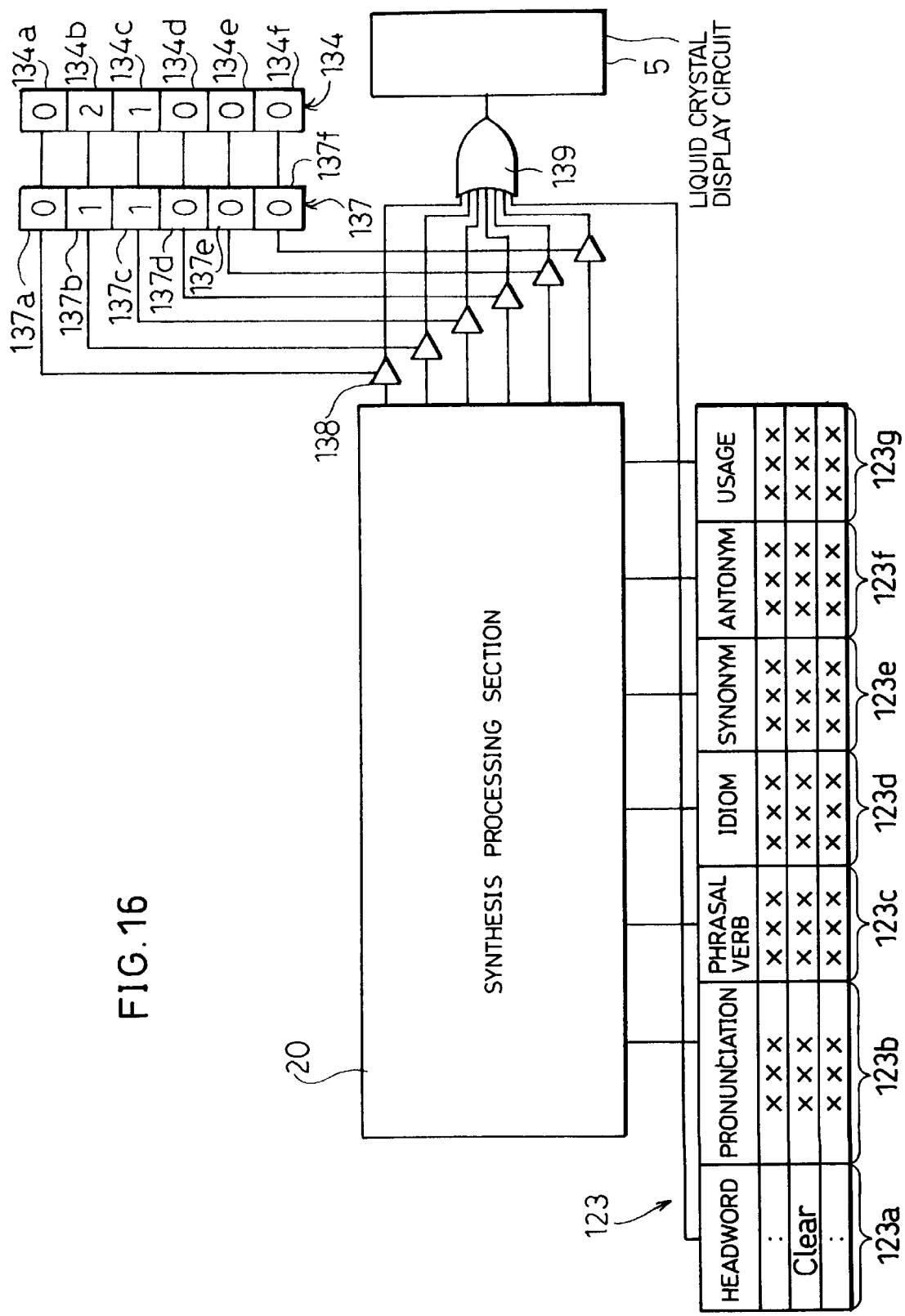
FIG. 16 is a block diagram schematically showing an arrangement of major components of an electronic dictionary in accordance with another example embodiment of the present invention to realize a display in a priority mode.
Figure 17:
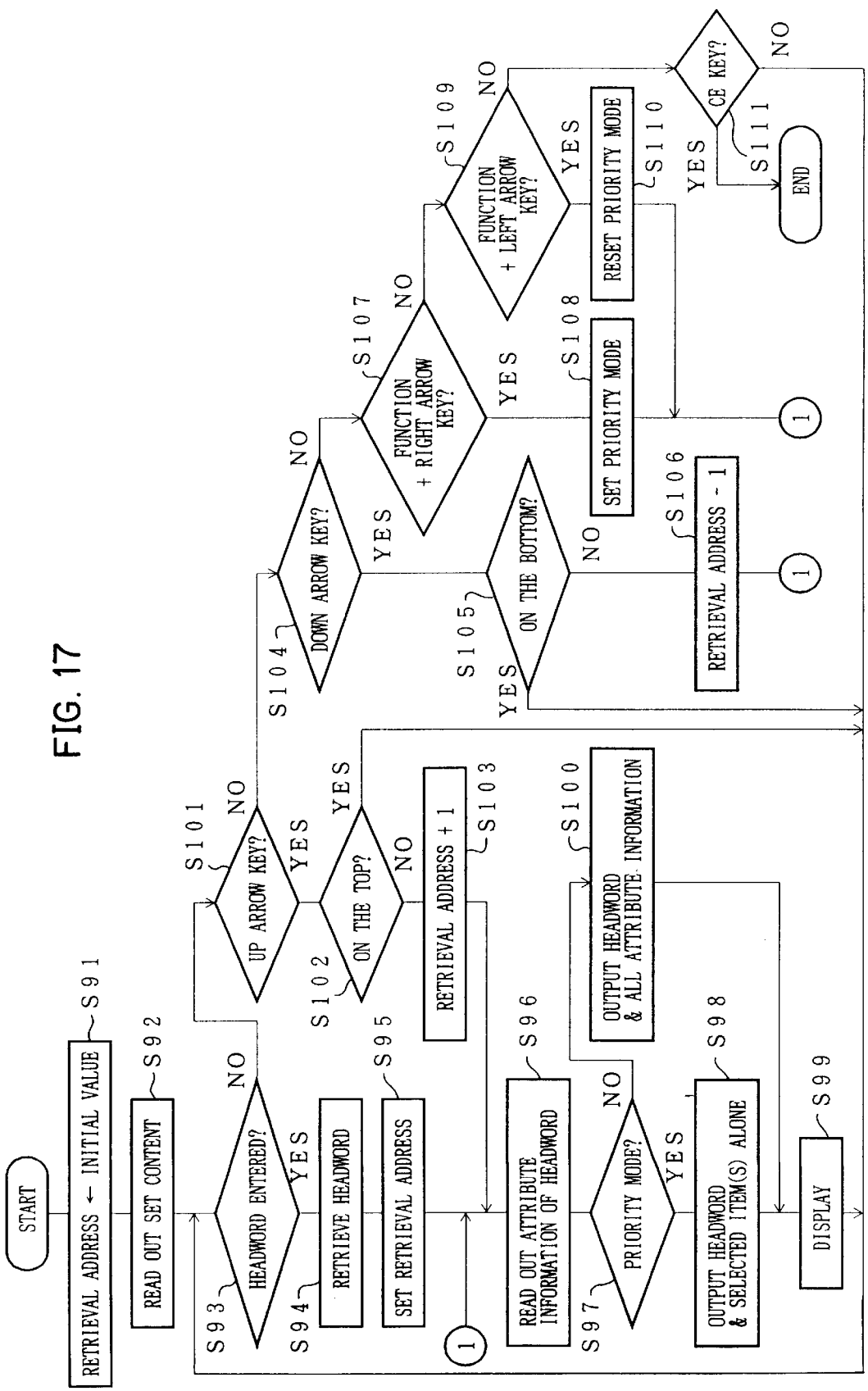
FIG. 17 is a flowchart detailing an operation of the central processing unit to realize the display in the priority mode.

Referring to FIGS. 16 and 17, the following description will describe another example embodiment of the present invention. Hereinafter, like components are labeled with like reference numerals with respect to Embodiment 1, and the description of these components is not repeated for the explanation's convenience.

An electronic dictionary of the present embodiment characterized by having a priority mode as one of the operation modes, in which the attribute information of the item(s) the user has selected for the highlight display is displayed with precedence over the attribute information of the non-selected items. More specifically, the present electronic dictionary displays only the attribute information of the items the user has selected on the liquid crystal display section 4 in the priority mode.

FIG. 16 is a block diagram depicting a major arrangement (priority display means) to realize the priority mode. As shown in the drawing, the electronic dictionary of the present embodiment is identical with its counterpart in Embodiment 1 except that a priority flag storage section 137 storing six priority flags 137a through 137f indicating which item the user has selected, gates 138 in the matching numbers with the items of the attribute information, and an OR circuit 139 are additionally provided. Note that FIG. 16 omits the selected style storage section 132 and use frequency counter 133 and the like of FIG. 6 for the explanation's convenience.

The priority flags 137a through 137f of the priority flag storage section 137 correspond to the flag 134a through 134f of the style variation storage section 134, respectively. Thus, if a value other than "0" is set to the flags 134a through 134f, a value "1" is set to the priority flags 137a through 137f. In other words, a value "1" is set to the priority flag corresponding to the item the user has selected for the highlight display in the priority flag storage section 137. Each gate 138 is opened when a value "1" is set to the their respective priority flags in the priority flag storage section 137.

Thus, the synthesis processing section 20 outputs only the item(s) the user has selected to the liquid crystal display circuit 5 through the OR circuit 139 after any of the aforementioned styles is added. Consequently, the item(s) the user has selected alone is (are) displayed on the liquid crystal display section 4.

If all the priority flags 137a through 137f of the priority flag storage section 137 are set to "1" forcibly regardless of the content of the style variation storage section 134, all the gates 138 are opened, whereby the priority mode is reset and both the selected and non-selected items are displayed on the liquid crystal display section 4.

The operation of the present electronic dictionary in response to the user's key manipulation will be explained in the following.

After the user selects the dictionary function and enters the headword of a word he wishes to retrieve, the present electronic dictionary retrieves the word, and as has been explained in Embodiment 1, the styles for the highlight display, such as a solidly shade or an underline in red, are added at least either of the title or the attribute information of the items the user has selected.

When the user manipulates the arrow keys 25 of the input section 2 without entering a word he wishes to retrieve, the words stored in the dictionary storage section 123 in the ROM 12 are displayed successively in alphabetical order together with their respective attribute information. Under these conditions, the attribute information of the item(s) the user has selected may be highlighted in a certain style.

When the user presses down the function key 27 and right arrow key of the arrow keys 25 of the input section 2 concurrently, the electronic dictionary is switched to the priority mode. In other words, only the attribute information of the item(s) the user has selected for the highlight display is highlighted in a predetermined style.

When the user presses down the function key 27 and the left arrow key of the arrow keys 25 of the input section 2 concurrently, the priority mode is reset, and the attribute information of all the items are displayed.

The operation of the CPU 10 to realize the above operation will be explained with reference to the flowchart of FIG. 17.

To being with, the CPU 10 sets an initial value to the retrieval address of the headword (S91), and reads out the content set by the user from the set flag storage section 136 (S92). Subsequently, the CPU 10 checks whether the user has entered the headword or not (S93). When the headword has not been entered, the CPU 10 proceeds to S101; otherwise, the CPU 10 retrieves the entered headword from the dictionary storage section 123 in the ROM 12 (S94).

Assume that the user has entered "clear" as the headword, then the CPU 10 sets a retrieval address where the headword "clear" is stored, and reads out the corresponding headword and its attribute information from the dictionary storage section 123 in the ROM 12 (S96).

Next, the CPU 10 checks whether the priority mode is set or not (S97). In case the priority mode is set, CPU 10 outputs the attribute information of the items selected for the highlight display alone to the liquid crystal display circuit 5 (S98), and displays the same on the liquid crystal display section 4 (S99) Consequently, the attribute information of the item(s) the user has selected for the highlight display is highlighted in the styles, such as a solid shade and an underline in red, with precedence over the attribute information of the non-selected items.

On the other hand, when the priority mode is not set, the CPU 10 outputs the headword and its attribute information entirely to the liquid crystal display circuit 10 (S100). Consequently, all of the attribute information of the headword is displayed on the liquid crystal display section 4 in S99. Note that the attribute information of the item(s) the user has selected for the highlight display is highlighted, and the attribute information of the non-selected items is displayed in the normal display.

Then, the CPU 10 checks whether the user has pressed down the up arrow key of the arrow keys 25 (S101). When the up arrow key has not been pressed down, the CPU 10 proceeds to S104; otherwise, the CPU 10 further checks whether the retrieval address is on the top of the dictionary storage section 123 (S102). When the retrieval address is on the top, the CPU 10 returns to S93; otherwise, the CPU 10 adds a value "1" to the retrieval address (S103), and proceeds to S96.

Then, the CPU 10 checks whether the user has pressed down the down arrow key of the arrow keys 25 (S104). When the down arrow key has not been pressed down, the CPU 10 proceeds to S107; otherwise, the CPU 10 further checks whether the retrieval address is on the bottom of the dictionary storage section 123 or not (S105). When the retrieval address is on the bottom, the CPU 10 returns to S93; otherwise, the CPU 10 subtracts a value "1" from the retrieval address (S106), and proceeds to S96.

Then, the CPU 10 checks whether the user has pressed down the function key 27 and the right arrow key of the arrow keys 25 concurrently (S107). When the checking result is NO in S107, the CPU 10 proceeds to S109, and when the checking result is YES in S107, the CPU 10 sets the priority mode (S108) and proceeds to S96.

Then, the CPU 10 checks whether the user has pressed down the function key 27 and the left arrow key of the arrow keys 25 concurrently or not (S109). When the checking result is NO in S109, the CPU 10 proceeds to Sill, and when the checking result is YES in S109, the CPU 10 resets the priority mode (S110) and proceeds to S96. Then, the CPU 10 checks whether the user has pressed down the CE key 28 or not (S111). When the user has not pressed down the CE key 28, the CPU returns to S93; otherwise, the CPU 10 ends the operation. In this manner, the selected attribute can be displayed with precedence over the non-selected attribute.

As has been explained, according to the arrangement of the present embodiment, the priority mode can be set only by pressing down the function key 27 and right arrow key concurrently, so that only the attribute information of the item(s) the user has selected is displayed on the liquid crystal display section 4. Consequently, only the data the user wishes to see can be displayed, thereby realizing a highly efficient electronic dictionary that displays information in an easy-to-see manner.

Also, the priority mode can be reset only by pressing the function key 27 and left arrow key, so that all the attribute information are displayed on the liquid crystal display section 4 with the attribute information of the item(s) the user has selected being highlighted. In other words, whether the selected item(s) alone should be displayed with precedence or all the items should be displayed with the selected item(s) being highlighted can be switched by a simple key manipulation. Consequently, it has become possible to provide an electronic dictionary which is easy to manipulate and able to retrieve information efficiently.

In the above explanation, only the attribute information of the item(s) the user has set for the highlight display are displayed on the liquid crystal display section 4 when the priority mode is set. However, the display method in the priority mode is not limited to the above. For example, the attribute information of the item(s) the user has selected for the highlight display may be displayed above the attribute information of the other non-selected item(s), namely, in the upper portion of the screen of the liquid crystal display section 4.

As has been explained, the electronic dictionary of the present embodiment displays the attribute information of the item(s) the user has selected for the highlight display with precedence over the attribute information of the other non-selected items. For example, only the attribute information of the item(s) the user has selected are displayed, or the attribute information of the items(s) the user has selected are displayed above the attribute information of the other non-selected item(s). According to the above arrangement, the user does not have to scroll the display screen to find the information he needs, thereby making it possible to provide an electronic dictionary with which the user can find the necessary data efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic dictionary comprising:
   a storage section for storing headwords and attribute information related to said headwords;
   a display section for displaying said headword and said attribute information;
   a selecting section for selecting an arbitrary item of said attribute information;
   a style selecting section for applying a highlight style which has been used least frequently among a variety of highlight styles to said selected item; and
   a display control section for displaying at least one of a title and said attribute information of said selected item in a style different from a style used for a non-selected item.

2. The electronic dictionary of claim 1, said display control section including a style adding section for superimposing a first character of a character string on a solid shade in a highlight color, and for underlining second to last characters of said character string.

3. The electronic dictionary of claim 1, said display control section including a style adding section for inserting a blank space of a solid shade in a highlight color at a head of a character string, and for underlining said character string.

4. The electronic dictionary of claim 1, said display control section superimposing at least a part of a character string on a solid shade in a highlight color.

5. The electronic dictionary of claim 1, said display control section underlining a character string in a highlight color.

6. The electronic dictionary of claim 1, said display control section placing a character string within a frame of a highlight color.

7. The electronic dictionary of claim 1, further including:
   a priority display section for displaying attribute information of said selected item with precedence over attribute information of said non-selected item.

8. The electronic dictionary of claim 7, wherein said priority section only displays attribute information of said selected item.

9. The electronic dictionary of claim 7, wherein said priority section displays attribute information of said selected item above attribute information of said non-selected item.

10. An information displaying method for an electronic dictionary, comprising:
    selecting an item to be highlighted, said item related to headwords having attribute information;
    selecting a highlight style which has been used least frequently from a variety of highlight styles for said selected item; and
    displaying at least one of a title and attribute information of said selected item in a style different from a style used for a non-selected item.

11. The method of claim 10, wherein said selected item is displayed with precedence over said non-selected item.

12. The method of claim 11, wherein only said selected item is displayed.

13. The method of claim 11, said step of displaying further including displaying said selected item above said non-selected item.

* * * * *